United States Patent [19]
Lin

[11] Patent Number: 5,044,584
[45] Date of Patent: Sep. 3, 1991

[54] ANGLE IRON AND ITS FAST PIPE HANGER

[76] Inventor: Tan H. Lin, No. 6, Alley 166, Yuh Cheng Street, Taipei, Taiwan

[21] Appl. No.: 438,173

[22] Filed: Nov. 20, 1989

[51] Int. Cl.⁵ .............................................. F16L 3/22
[52] U.S. Cl. .................................... 248/68.1; 248/73; 248/231.1; 403/388
[58] Field of Search .................. 248/68.1, 65, 72, 73, 248/58, 49, 74.1, 231.1, 231.9, 230, 500, 507, 510; 52/633, 473, 507; 403/388, 395, 400

[56] References Cited

U.S. PATENT DOCUMENTS

| | | | |
|---|---|---|---|
| 0,648,501 | 5/1900 | Kronenberg | 248/230 X |
| 0,871,490 | 11/1907 | Duncan | 248/231.1 |
| 2,765,135 | 10/1956 | Chellis | 248/68.1 |
| 2,894,773 | 7/1959 | Noe | 403/400 X |
| 2,990,920 | 7/1961 | Hoffman, Jr. | 52/633 |
| 4,167,033 | 9/1979 | Fletcher | 248/230 X |
| 4,320,882 | 3/1982 | Bachle | 248/72 X |
| 4,592,186 | 6/1986 | Braginetz | 403/400 x |
| 4,595,165 | 6/1986 | Klingensmith et al. | 248/230 X |
| 4,729,532 | 3/1988 | Moss | 248/231.1 X |
| 4,744,535 | 5/1988 | Patenaude | 248/74.1 |

Primary Examiner—Ramon O. Ramirez
Attorney, Agent, or Firm—Lowe, Price, LeBLanc, Becker & Shur

[57] ABSTRACT

The present invention it to provide an angle iron for speedy pipe hanging, particularly is related to an angle iron requires no prior size measuring and boring during the construction of pipe hanging so to save man hours and is applicable to all tubular objects having the general specification that allos easy and facilitated use as its primary objective. The present invention comprises a set of angle iron and fastening components, which including U screws, nuts and packings. Essentially, it is characterized by pre-punching out on either plane of the angle iron a series of strip openings with each abutted openings having a certain spacing while both ends showing an arch respectively; then the processed angle iron requires no size measureing and boring when to be feastened to the tubular objects as to allow speedy construction, particularly is applicable to the fastening of pipe hanging of tubular objects having the general specification.

1 Claim, 2 Drawing Sheets

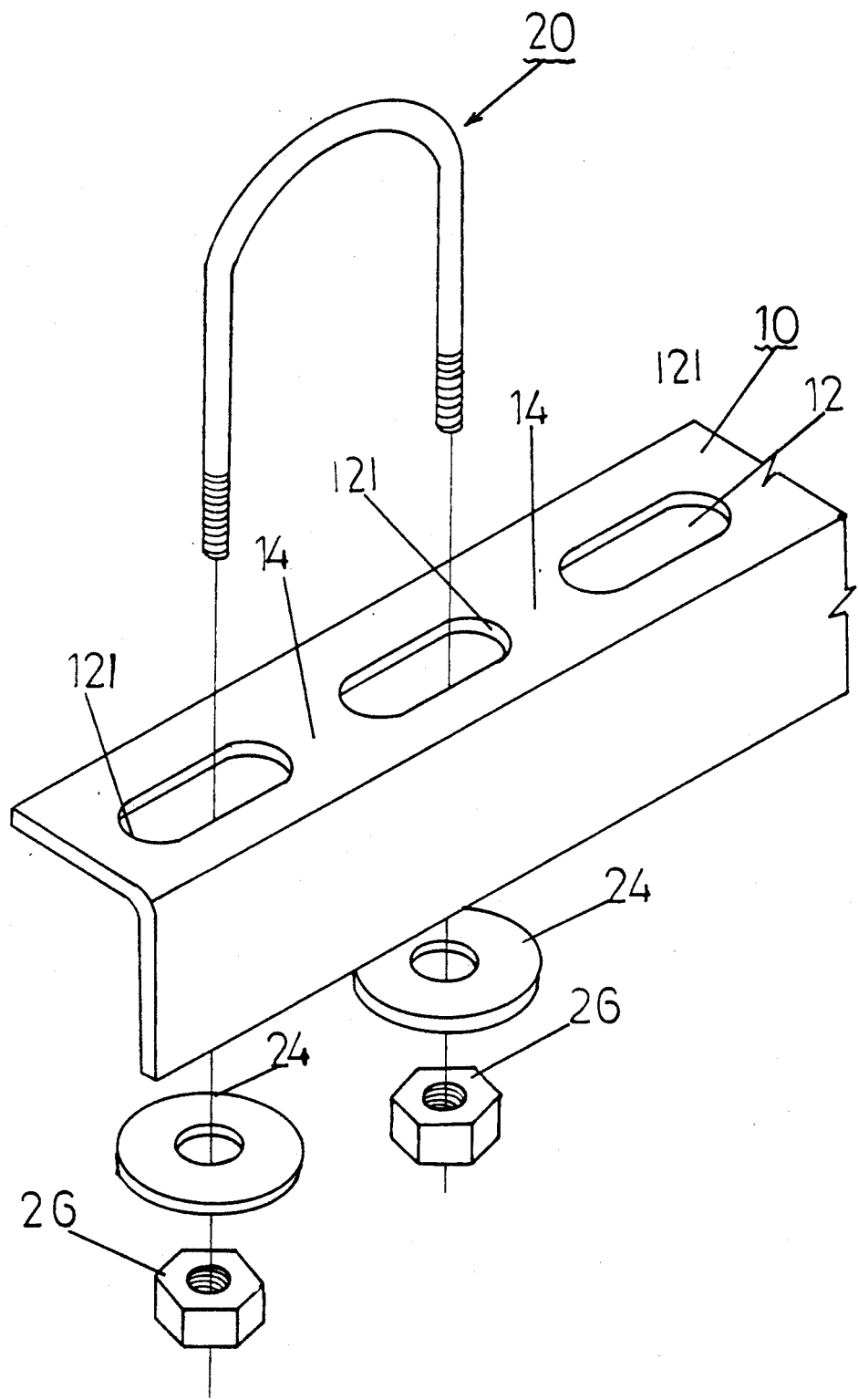
FIG:1

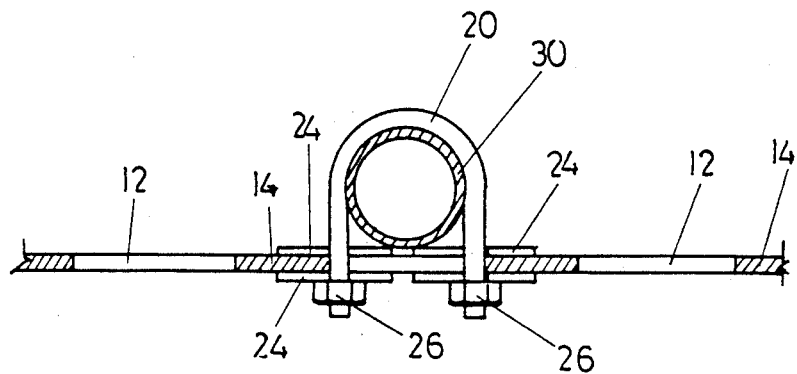
FIG: 3
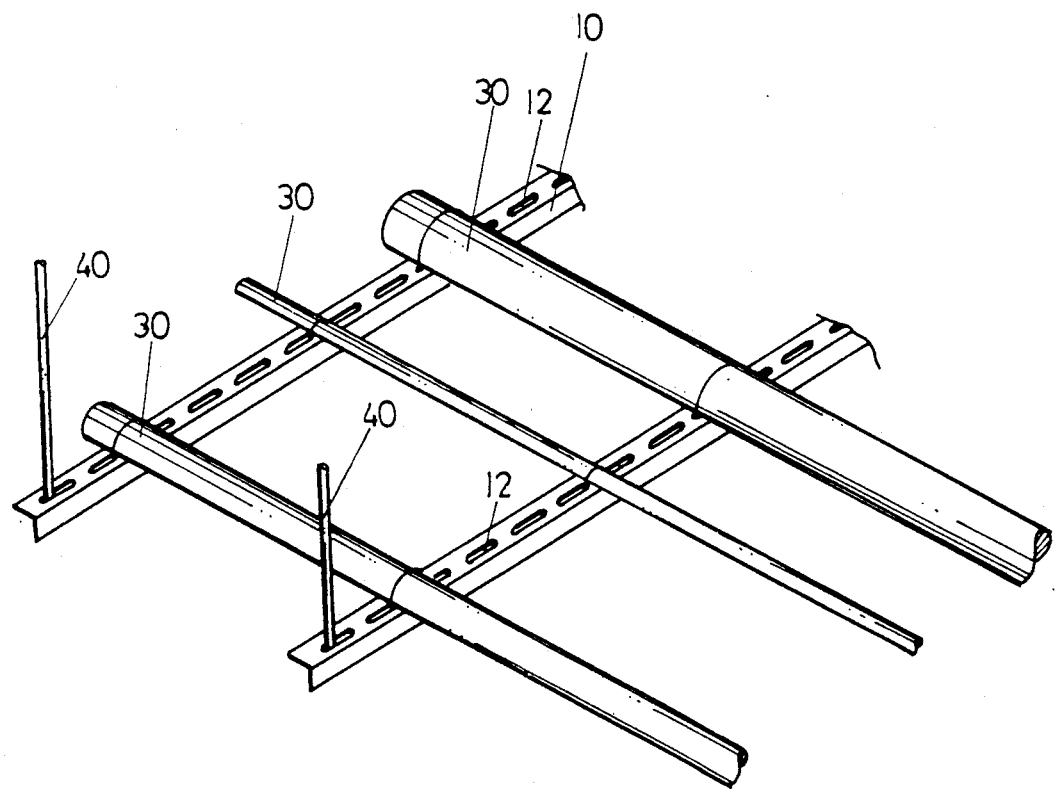
FIG: 2

ANGLE IRON AND ITS FAST PIPE HANGER

BACKGROUND OF THE INVENTION

1. Field of the Invention

This is invention relates to an angle iron and its pipe hanger for use in the construction of pipe hanger having general specification.

2. Description of the Prior Art

The prior art of angle iron and the pipe hanger therefor, particularly relates to an angle iron having the present length for the tubular object to mount by means of U screws prior 1t those tubular objects having various diameters that required hanging during the construction of piping for power/water supply of architecutural project, making the angle iron indicate an overhead beam and has been comprehensively applied by the industry of pipe hanging. Thanks to that even under long-term loading such L type angle iron will not be easily subject to distortion. Construction personnel, however, must at first measure the size of the pipe diameter when the tubular objects with various diameters are required to be fastened onto the angle iron followed by observing a specified distance to drill holes on the angle iron and then the tubular objects are fastened onto the angle iron by using U bolts. The disadvantage generated from the construction of the prior art is that the operation of mounting the pipe hanger can only be completed through a time-consuming measuring and hole drilling. The waste of man-hour is apparent, particularly the bored angle iron can only be adaptable to tubular object having the definite outer diameter as re-drilling is a must when the same angle iron to be applied for fixing with another tubular object having different specification. And it is quite incovenient for the already fixed overhead angle iron shall be dismantled for re-drilling. Increased construction time and reduced working efficiency are unable to be avoided, particularly nowadays the labor cost is so expensive. When one working day is saved, a significant labor cost can be saved accordingly. With the above in view, this Inventor once employed the working principle of punch to punch a series of round holes and still the interlocking between the U bolts and diameter spectification of applicable tubular objects is very limited, in other words, the design of such series of round holes failed to be generalized; subsequently, after a long analysis on the sizes of the specification to the general tubular objects available in the market, finally, a pipe-hanging angle iron adapatable to general size of the spectioncation of tubular objects has been invented.

SUMMARY OF THE INVENTION

Accordingly, the chief object of the present invention is to provide a speedy pipe hanging angle iron that requires no size measuring and boring during the construction so to achieve the purposes of man-hour saving and easy operation featured by the adapatation to the tubular objects having general specification. According to this present invention, the members include a set of angle iron and fastening components, which further comprise of U bolts, nuts and packings, characterized by the application of punching to pre punch on such angle iron strip openings at a certain spacing while allowing both edges of such opening being in the shape of arch, thus to avoid the trifling procedure of size measuring and boring during the construciton of the fastening of the tubular objects by means of such bores pre-punched angle iron to complete the construction within a short-time, particularly applicable for the pipe hanging to fasten the tubular objects having general specification.

BRIEF DESCRIPTION OF THE DRAWING

The present invention will become more readily apparent from the following description of the preferred embodiment of the present invention taken in conjunction with the accompanying drawing, in which:

FIG. 1 is a sectional view of the break-down of the present invention;

FIG. 2 is the view illustrating the preferred embodiment of the present invention; and FIG. 3 is the sectional view illustrating the parts of a U bolt fastened to a single opening of the present invention.

To summarize then, each slot 12 is of a first predetermined length, the ends thereof defining an arc having a diameter equal to that of the U bolt 20. The space between each slot 12 is then of a second predetermined length whereby a U bolt 20 may be received within a slot 12 as shown in FIG. 3 or each leg received in adjacent slots 12 as shown in FIG. 1. The lengths of the space between adjacent slots then must be less than or equal to the internal width of the U bolt 20 and the lengths of the slot 12 would be equal to the external width of the U bolt 20.

DESCRIPTION OF THE PREFERRED EMBODIMENT

As shown in FIG. 1, the present invention comprises a set of fastening components including a U bolt 20, packings 24 and nuts 26 members, characterized by a set of angle iron 10 having a certain lenght, a series of strip, abutted at a specified specing openings 12 prepunched on either side of such angle iron 10 as such openings 12 each having its both ends showing an arch 121 respectively allowing a speedy and facilitated fasenting to angle iron 10 of the tubular object 30(as shown in FIG. 2) having the commonly used specification by means of the fasenting members 20, and further by using the suspension beam 40 fixed to the ceiling to suspend the angle iron 10 for achieving its purpose.

The effect ahieved by the aforesaid features carry the following excellent qualities during the implementation.

1) U bolt 20 is allowed very facilitated adjustment of position within the strip opening 12 as in case of the occasion that requires the tubular object 30 to be arrayed with slanting angle can also be easily complished; further in FIG. 2, the plane 14 between the abutted openings will supplement the tensile strength lost at the expense of the punch of the strip opening to the whole piece of angle iron 10. In fact, under the practical tensile condition of the pipe hanging, the other panel without the openings of the angle iron 10 is subject to more signficant torque, therefore, the design of the openings cause no affects to the tensile strength of the whole piece of angle iron.

2) In FIG. 3, in case that the diameter is extremely small of the tubular object, the use of U screw 20 to accomodate the tubular object 30 and then fasten it to the plane on the edge of strip opening 12 directly by means of packing 24. Theefore, it is apparent that all the tubular objects 30 in various specification can be applicable on the angle iron 10 of the present invention.

We claim:

1. A pipe hanger comprising in combination: at least one L-shape angle iron member having a plurality of mutually spaced slots along substantially the length of one leg of said member each slot having a first predetermined length and defining an arc of predetermined radius at either end thereof and the space between each slot being a second predetermined length;

a plurality of circular in cross section U-bolts each having threaded ends and a cross sectional radius substantially the same as the arc at either end of the slots, the width across the legs of each bolt being substantially equal to the first predetermined length and the width between the legs of each bolt no less than the second predetermined length;

fastener means for threadedly engaging the ends of each bolt whereby said bolts may either be inserted through each slot or the legs thereof inserted through adjacent slots to encircle a pipe and clamp it against said member when said fastener means engages the threaded ends thereof.

* * * * *